(12) United States Patent
Bang et al.

(10) Patent No.: US 9,798,173 B2
(45) Date of Patent: Oct. 24, 2017

(54) LIQUID CRYSTAL DISPLAY

(71) Applicant: Samsung Display Co., Ltd., Yongin-si, Gyeonggi-Do (KR)

(72) Inventors: Jung Suk Bang, Seoul (KR); You Young Jin, Suwon-si (KR); Sang Il Kim, Yongin-si (KR); Won-Chul Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 64 days.

(21) Appl. No.: 14/878,730

(22) Filed: Oct. 8, 2015

(65) Prior Publication Data

US 2016/0202536 A1 Jul. 14, 2016

(30) Foreign Application Priority Data

Jan. 13, 2015 (KR) ........................ 10-2015-0006321

(51) Int. Cl.
*G02F 1/1333* (2006.01)
*G02F 1/1341* (2006.01)
*G02F 1/1343* (2006.01)
*G02F 1/1368* (2006.01)
*G02F 1/1337* (2006.01)

(52) U.S. Cl.
CPC ...... *G02F 1/133308* (2013.01); *G02F 1/1337* (2013.01); *G02F 1/1341* (2013.01); *G02F 1/1368* (2013.01); *G02F 1/133377* (2013.01); *G02F 1/134336* (2013.01); *G02F 2001/133334* (2013.01)

(58) Field of Classification Search
CPC ............. G02F 1/133308; G02F 1/1337; G02F 1/1368; G02F 1/133377; G02F 1/1341; G02F 1/134336; G02F 2001/133334
See application file for complete search history.

(56) References Cited

U.S. PATENT DOCUMENTS

| 6,655,788 | B1* | 12/2003 | Freeman | G02F 1/133308 347/58 |
| 9,195,087 | B2* | 11/2015 | Terashima | G02B 6/0085 |
| 2001/0052949 | A1* | 12/2001 | Yamaguchi | G02F 1/136213 349/39 |
| 2006/0103285 | A1* | 5/2006 | Lee | G02F 1/133528 313/239 |
| 2011/0292315 | A1* | 12/2011 | Bae | G02B 6/0088 349/58 |
| 2013/0293799 | A1* | 11/2013 | Lee | G02F 1/13394 349/42 |
| 2013/0321740 | A1* | 12/2013 | An | H05K 5/0217 349/58 |

FOREIGN PATENT DOCUMENTS

| JP | 2010-140831 | 6/2010 |
| KR | 1020140002243 A | 1/2014 |
| KR | 1020140080272 A | 6/2014 |

* cited by examiner

*Primary Examiner* — Donald Raleigh
*Assistant Examiner* — Kevin Quarterman
(74) *Attorney, Agent, or Firm* — Innovation Counsel LLP

(57) ABSTRACT

A liquid crystal panel (LCD) may include: a flexible liquid crystal panel; and a housing unit for housing the liquid crystal panel. The housing unit may have an integrated structure which includes a bottom surface, a side surface connected from the bottom surface, and a top fixing end connected from the side surface, the liquid crystal panel may be housed between the bottom surface and the top fixing end, and the housing unit may be formed of a flexible soft material.

19 Claims, 14 Drawing Sheets

LIQUID CRYSTAL DISPLAY

CROSS-REFERENCE TO RELATED APPLICATION

This application claims priority to and the benefit of Korean Patent Application No. 10-2015-0006321 filed in the Korean Intellectual Property Office on Jan. 13, 2015, the entire contents of which are incorporated herein by reference.

BACKGROUND (a) Field

The present application relates to a liquid crystal display (LCD).

(b) Description of the Related Art

Recently, with the rapid development of semiconductor technology, electronic devices have been reduced in size and weight. Thus, a demand for liquid crystal displays (LCD) with further improved performance has explosively increased.

An LCD to which much attention has been recently paid has advantages in terms of reduction in size, weight, and power consumption. Thus, the LCD has been considered as an alternative capable of overcoming the disadvantages of conventional cathode-ray tubes (CRT). At present, the LCD is mounted on almost all types of information processing devices requiring a display device.

A general LCD converts a specific molecule arrangement of liquid crystals into another molecule arrangement by applying a voltage to the specific molecule arrangement, and converts a change in optical property of a liquid crystal cell, which emits light through the molecule arrangement, into a visible change. The optical property includes birefringence, optical rotary power, dichroism, or optical scattering. That is, the general LCD is a non-emissive display which displays information using modulation of light through liquid crystal cells.

The LCD includes a liquid crystal panel and a frame housing the liquid crystal panel. The frame typically includes a bottom chassis and a top chassis. The bottom chassis fixes the bottom and side surfaces of the liquid crystal panel, and the top chassis fixes the top surface of the liquid crystal panel.

Such a frame is generally manufactured of a hard material, in order to fix the liquid crystal panel.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display (LCD) which has an integrated structure of a top chassis and a bottom chassis, and includes a housing unit made of a flexible soft material and a flexible liquid crystal panel.

According to an exemplary embodiment, an LCD may include: a flexible liquid crystal panel; and a housing unit for housing the liquid crystal panel. The housing unit may have an integrated structure which includes a bottom surface, a side surface connected from the bottom surface, and a top fixing end connected from the side surface, the liquid crystal panel may be housed between the bottom surface and the top fixing end, and the housing unit may be formed of a flexible soft material.

The top fixing end may have a fixing protrusion disposed on a surface in contact with the liquid crystal panel.

The fixing protrusion may be formed of a material having a high friction force.

The housing unit may include a fixing frame disposed therein.

The fixing frame may be formed of a hard material.

The fixing frame may be a metal.

The fixing frame may be disposed only in a part of the housing unit.

The fixing frame may be disposed only in one direction of a horizontal direction and a vertical direction of the housing unit, or disposed in both of the horizontal direction and the vertical direction of the housing unit.

The housing unit may have a quadrangle shape, and include reinforcement parts disposed along the side surface of the top fixing end and the outer surface of the housing unit.

The reinforcement parts may be formed of a hard material.

The reinforcement parts may be formed of a metal or reinforced plastic.

The housing unit may have corner reinforcement parts disposed at respective corners of the housing unit so as to cover the bottom surface, the side surface, and the top surface of the housing unit.

The corner reinforcement parts may be formed of a hard material.

The corner reinforcement parts may be formed of a metal or reinforcement plastic.

The housing unit may have a static electricity prevention part disposed on the bottom surface so as to be exposed to the outside, and the static electricity prevention part may be formed of a conductive material.

The static electricity prevention part may be disposed as a plurality of lines arranged in one direction of the bottom surface.

The static electricity prevention part may be disposed in a lattice shape on the bottom surface.

The liquid crystal panel may include: a substrate including a plurality of pixel areas arranged in a matrix shape including a plurality of pixel rows and a plurality of pixel columns; a thin film transistor disposed over the substrate; a pixel electrode connected to the thin film transistor so as to be disposed in the pixel areas; a common electrode disposed over the pixel electrode so as to be spaced from the pixel electrode with a microcavity interposed therebetween; a roof layer disposed over the common electrode; a liquid crystal injection hole disposed in the common electrode and the roof layer so as to extend to a part of the microcavity; a liquid crystal layer filling the microcavity; and an overcoat disposed over the roof layer so as to cover the liquid crystal injection hole, and sealing the microcavity.

The liquid crystal panel may be bent in the left and right or top and bottom direction.

The housing unit may have an integrated structure which includes a bottom surface of a quadrangle, four side surfaces disposed in four directions perpendicular to the bottom surface, and a top fixing end disposed at each side surface so as to extend in parallel to the bottom surface, and the top fixing end may have a frame shape.

As described above, the LCD according to the exemplary embodiment may include the housing unit having an integrated structure, and formed of a flexible soft material. Thus, after the flexible liquid crystal panel is housed in the housing unit, the LCD may be bent to implement a curved LCD.

DETAILED DESCRIPTION OF THE EMBODIMENTS

Figure 1:
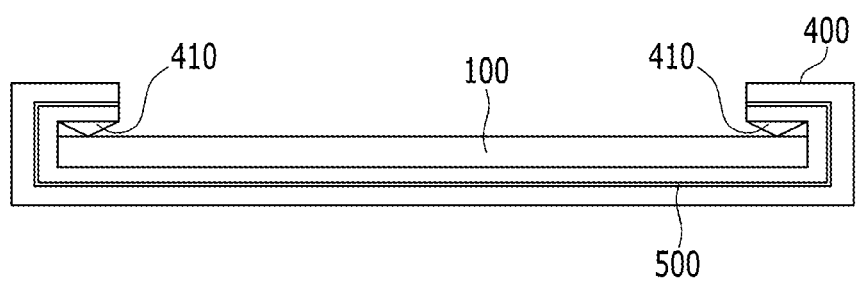
FIG. 1 briefly illustrates a cross-section of an LCD according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display (LCD) according to an exemplary embodiment will be described in detail with reference to the drawings.

FIG. 1 briefly illustrates a cross-section of an LCD according to an exemplary embodiment. Referring to FIG. 1, the LCD according to the exemplary embodiment includes a liquid crystal panel 100 and a housing unit 400 for fixing and housing the liquid crystal panel 100.

The liquid crystal panel 100 may be bent. The liquid crystal panel 100 may be implemented with a single substrate, and include a minute space formed over the substrate and filled with liquid crystals, e.g., liquid crystal molecules. The specific structure of the liquid crystal panel 100 will be described.

The housing unit 400 may be formed of a soft flexible material. The housing unit 400 may be formed of any materials, as long as the materials have elasticity. A typical polymer material may be used as the material of the housing unit 400. The housing unit 400 may also be formed of a flexible metal. That is, the housing unit 400 may be formed of any materials, as long as the materials can be bent to a predetermined range.

As illustrated in FIG. 1, the housing unit 400 has an integrated structure including an internal space in which the liquid crystal panel 100 can be fixed. That is, the housing unit 400 includes a bottom surface formed in a plate shape, a side surface connected from the bottom surface, and a top fixing end connected from the side surface.

The top fixing end has a length enough to fix the liquid crystal panel, and the liquid crystal panel is housed and fixed between the bottom surface and the top fixing end.

Further, the top fixing end has a fixing protrusion 410 formed on the bottom surface thereof, that is, the surface facing the liquid crystal panel 100. Although described below in detail, the fixing protrusion 410 is formed of a material having a large friction force. Through the fixing protrusion 410, the liquid crystal panel 100 can be fixed.

The housing unit 400 is formed of a soft material. Thus, the housing unit 400 may include a fixing frame 500 formed therein, in order to maintain the shape of the housing unit 400. As illustrated in FIG. 1, the fixing frame 500 is formed in the housing unit 400 made of a soft material, and serves to maintain the shape of the housing unit 400. Since the fixing frame 500 is included in the material of the housing unit 400, the fixing frame 500 may not be seen from outside. The fixing frame 500 may be formed across the entire housing unit 400, but formed only in a part of the housing unit 400 in order to maintain the elasticity of the housing unit 400 in another embodiment. The specific shape of the fixing frame 500 will be described below.

Hereafter, the housing unit 400 will be described.

Figure 2A:
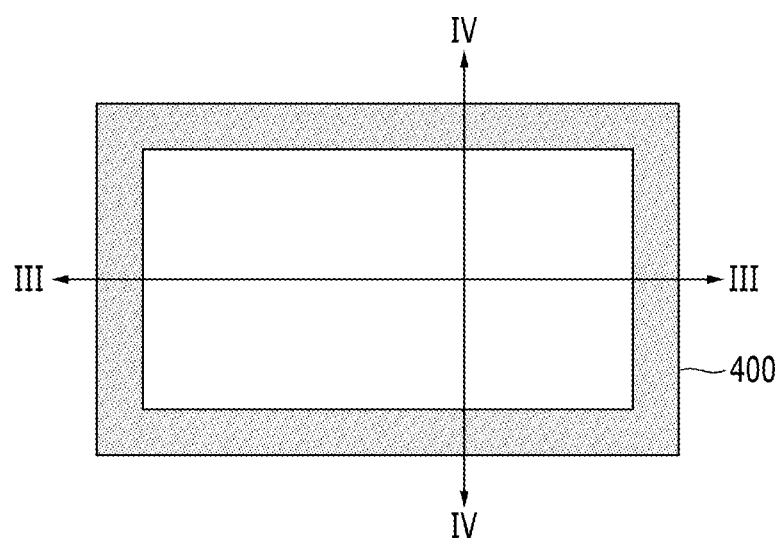
FIG. 2A is a top plan view of a housing unit of the LCD according to the exemplary embodiment.
Figure 2B:
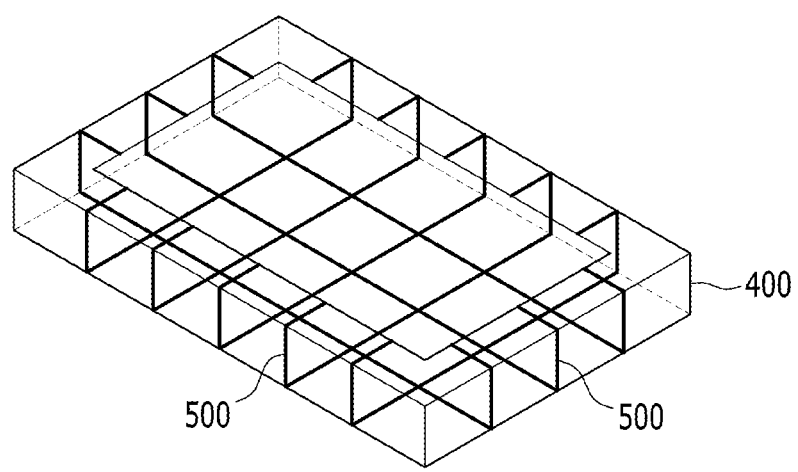
FIG. 2B illustrates a fixing frame of the housing unit in the LCD according to the exemplary embodiment.

FIG. 2A is a top plan view of the housing unit 400 of the LCD according to the exemplary embodiment. FIG. 2B illustrates the fixing frame 500 of the housing unit 400 in the LCD according to the exemplary embodiment.

As illustrated in FIG. 2A, the housing unit 400 is formed in such a shape that the narrow top surface (top fixing end), the side surface, and the bottom surface are connected to each other.

Referring to FIG. 2B, the housing unit 400 includes a plurality of fixing frames 500 formed therein, the fixing frames 500 collectively sometimes being called the fixing frame 500. FIG. 2B illustrates that the fixing frame 500 is formed in the right and left and top and bottom directions.

However, the fixing frame 500 may be formed only in one of the left and right direction and the top and bottom direction.

FIG. 2B conceptually illustrates the formation positions of the fixing frames 500. In reality, however, the fixing frames 500 may not be seen from outside because the fixing frames 500 are positioned in the housing unit 400 made of a soft material, as illustrated in FIG. 1.

The number of the fixing frames 500 may be properly adjusted. The fixing frame 500 may be formed of any materials, as long as the materials are hard materials. That is, the fixing frame 500 can be formed of a metal, a hard ceramic material, or a hard plastic material. The fixing frame 500 according to the exemplary embodiment may include a metal wire.

Figure 3:
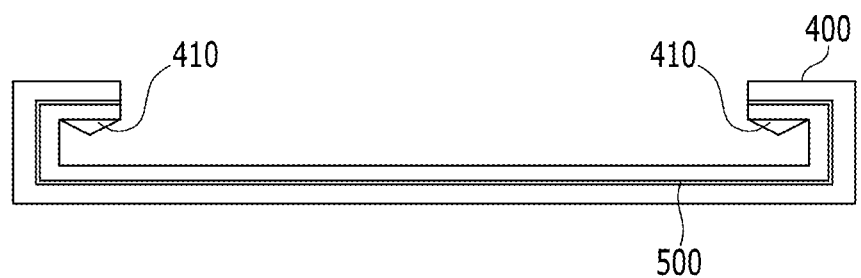
FIG. 3 is a cross-sectional view of the housing unit of FIG. 2A, taken along III-III line.
Figure 4:
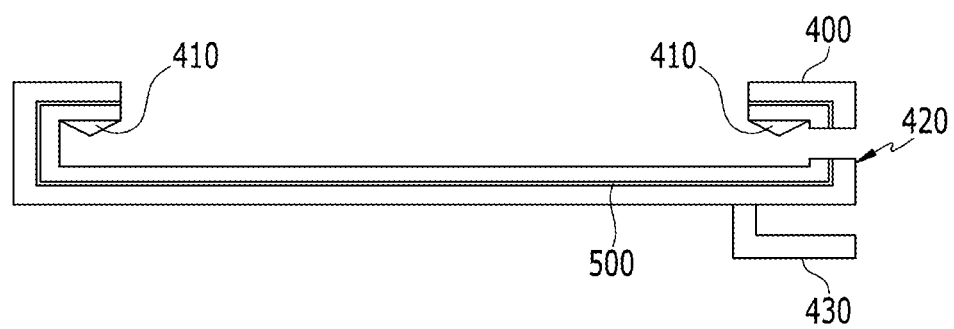
FIG. 4 is a cross-sectional view of the housing unit of FIG. 2A, taken along IV-IV line.

FIG. 3 is a cross-sectional view of the housing unit of FIG. 2A, taken along III-III line. FIG. 4 is a cross-sectional view of the housing unit of FIG. 2A, taken along IV-IV line.

Referring to FIGS. 2 and 3, the housing unit 400 according to the exemplary embodiment has an integrated structure in which the bottom surface, the side surface, and the top surface are connected to each other, and the fixing frames 500 exist in the housing unit 400. FIG. 3 illustrates a cross-section on which the fixing frame 500 is formed. On another cross-section of FIG. 2A, however, the fixing frame 500 may not be formed.

Referring to FIG. 3, the housing unit 400 is formed of a soft material, the fixing frame 500 made of a hard material exists in the housing unit 400, and the fixing protrusion 410 is formed on the top fixing end of the housing unit 400.

The fixing protrusion 410 serves to fix the liquid crystal panel 100, when the liquid crystal panel 100 is housed in the housing unit 400. Thus, the fixing protrusion 410 may be made of a material having a large friction force. The fixing protrusion 410 may be made of any materials, as long as the materials have a large friction force. The fixing protrusion 410 may be separately attached to the housing unit 400, or a part of the housing unit 400 may form the fixing protrusion 410. That is, the housing unit 400 and the fixing protrusion 410 may be integrated with each other.

The fixing protrusion 410 may have a sharp end in order to increase the fixing force. That is, the fixing protrusion 410 may have a triangle shape as illustrated in FIG. 3, but is not limited thereto.

The fixing protrusion 410 may be formed in a rectangular ring shape connected along the entire top fixing end, and formed in an island shape only at parts of the top fixing end in another embodiment. The fixing protrusion 410 may be selectively positioned only at the left and right surfaces or the top and bottom surfaces of the housing unit 400. Further, the fixing protrusion 410 may exist only at the four corners of the housing unit 400. The number and positions of the fixing protrusions 410 may be properly adjusted by a person skilled in the art.

FIG. 4 is a cross-sectional view of the housing unit of FIG. 2A, taken along IV-IV line. Referring to FIG. 4, an opening 420 is formed at one surface of the housing unit 400. Further, a second housing unit 430 is formed under the opening 420. The opening 420 may be formed at any one of the four side surfaces of the housing unit 400, and the opening 420 may be formed only at a part of one surface.

The opening 420 may be used as a path through which a wiring for connecting the liquid crystal panel 100 to a printed circuit board (PCB) escapes. That is, a PCB 150 may be housed in the second housing unit 430, and the housed PCB 150 and the liquid crystal panel 100 may be connected to each other through the wiring via the opening 420 as illustrated in FIG. 5.

Figure 5:
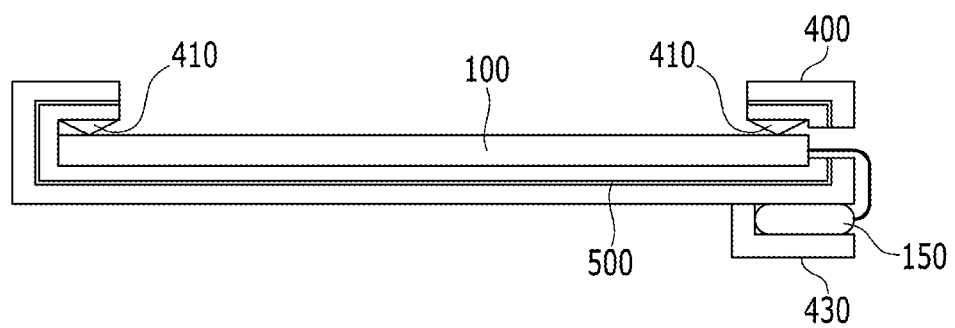
FIG. 5 illustrates a cross-section of the LCD according to the exemplary embodiment.

FIG. 5 illustrates a cross-section of the LCD according to the exemplary embodiment. Referring to FIG. 5, the liquid crystal panel 100 is housed in the housing unit 400, and the PCB 150 is housed in the second housing unit 430. The liquid crystal panel 100 and the PCB 150 are connected to each other through the wiring via the opening 420 formed in the housing unit 400.

Figure 6:
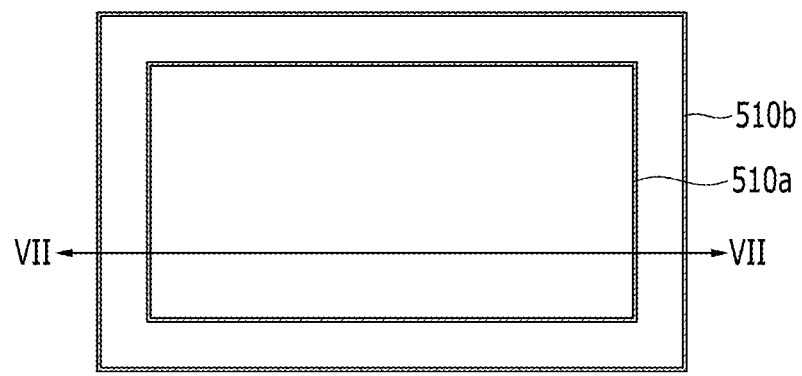
FIG. 6 illustrates a housing unit according to another exemplary embodiment.
Figure 7:
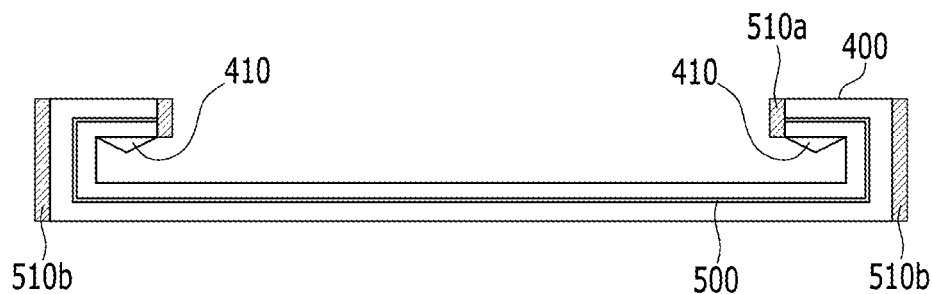
FIG. 7 is a cross-sectional view of the housing unit of FIG. 6, taken along VII-VII line.

Then, referring to FIGS. 6 to 13, the LCD according to exemplary embodiments will be described. FIG. 6 illustrates a housing unit according to another exemplary embodiment. FIG. 7 is a cross-sectional view of the housing unit of FIG. 6, taken along VII-VII line.

Referring to FIGS. 6 and 7, the housing unit 400 of the LCD according to the exemplary embodiment includes reinforcement parts 510a and 510b formed at inner and outer edges of the housing unit 400.

The reinforcement parts 510a and 510b may be made of a hard material, and reinforce the structure of the housing unit 400 made of a soft material.

In an exemplary embodiment, the reinforcement parts 510a and 510b may be made of a metal. Further, the reinforcement parts 510a and 510b may be made of a hard plastic material.

As illustrated in FIGS. 6 and 7, the inner reinforcement part 510a is formed at the side surface of the top fixing end of the housing unit 400. The inner reinforcement part 510a may be formed along the edge of the top fixing end of the housing unit as illustrated in FIG. 6.

Further, the outer reinforcement part 510b may be formed along the outer side surface of the housing unit 400 as illustrated in FIGS. 6 and 7. In this case, as illustrated in FIG. 7, the outer reinforcement part 510b may be formed at the same height as the side surface of the housing unit 400.

The inner reinforcement part 510a and the outer reinforcement part 510b may be attached to the housing unit 400. Only one of the inner reinforcement part 510a and the outer reinforcement part 510b may be formed. That is, only the inner reinforcement part 510a or the outer reinforcement part 510b may be formed.

The inner and outer reinforcement parts 510a and 510b may be formed of the same material as the internal fixing frames 500.

Figure 8:
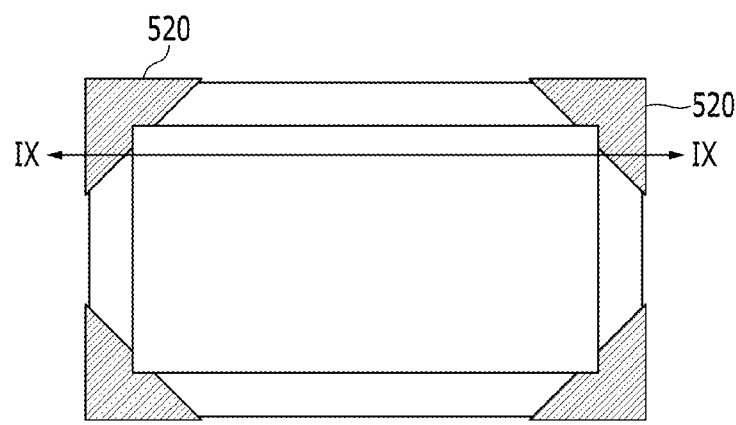
FIG. 8 illustrates a housing unit according to another exemplary embodiment.

FIG. 8 illustrates a housing unit according to another exemplary embodiment.

The housing unit of the LCD according to the exemplary embodiment of FIG. 8 has corner reinforcement parts 520 formed at the respective corners of the housing unit.

As illustrated in FIG. 8, the corner reinforcement parts 520 may be formed at the four corners of the housing unit 400.

Figure 9:
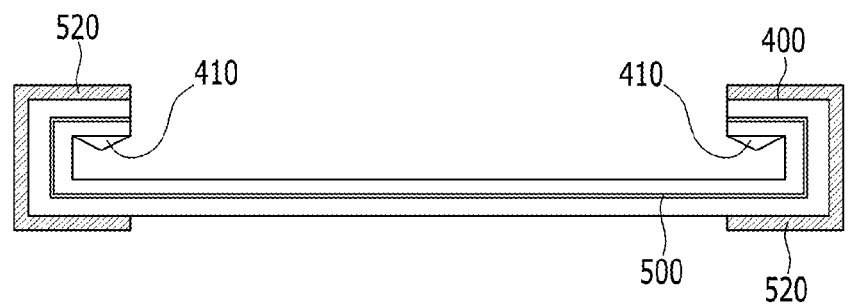
FIG. 9 is a cross-sectional view of the housing unit of FIG. 8, taken along IX-IX line.

FIG. 9 is a cross-sectional view of the housing unit of FIG. 8, taken along IX-IX line. Referring to FIG. 9, the corner reinforcement parts 520 are formed to cover the top fixing end, the side surface, and the bottom surface of the housing unit 400. That is, as illustrated in FIG. 9, the corner reinforcement parts 520 maintain the shape of the housing unit 400 made of a soft material, while covering the top fixing end, the side surface, and the bottom surface of the housing unit 400.

The corner reinforcement part 520 may be formed of a hard material. That is, the corner reinforcement part 520 may be formed of a metal or reinforced plastic. The corner reinforcement part 520 may be formed of the same material as the fixing frame 500 formed in the housing unit 400.

Figure 10:
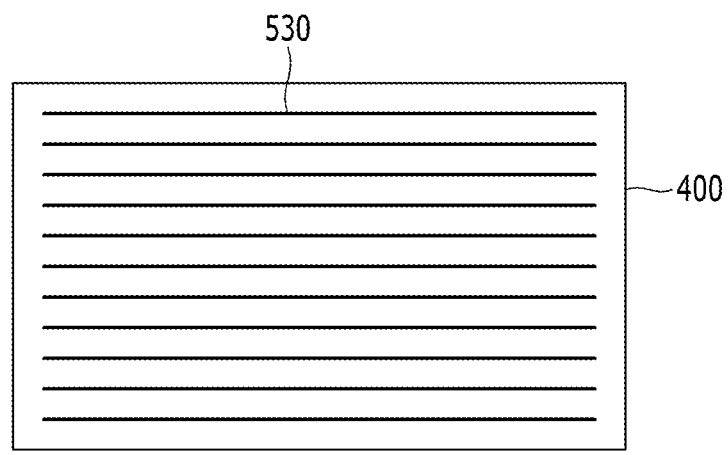
FIG. 10 illustrates the bottom surface of the housing unit of the LCD according to the exemplary embodiment.
Figure 11:
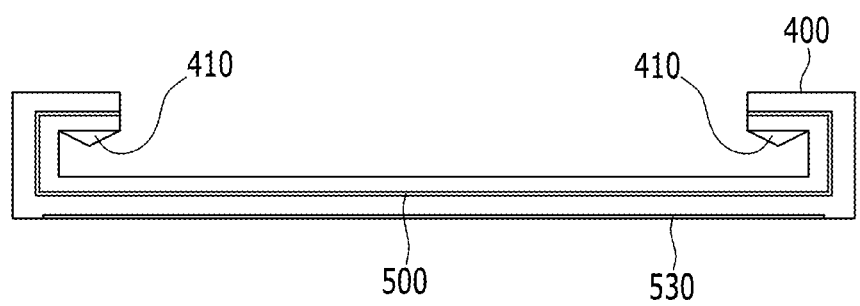
FIG. 11 is a cross-sectional view of the housing unit according to the exemplary embodiment of FIG. 10, illustrating the same cross-section as FIG. 3.

FIG. 10 illustrates the bottom surface of the housing unit of the LCD according to the exemplary embodiment. FIG. 11 is a cross-sectional view of the housing unit according to the exemplary embodiment of FIG. 10, illustrating the same cross-section as FIG. 3.

The housing unit 400 according to the exemplary embodiment of FIG. 10 includes a static electricity prevention part 530 formed at the bottom thereof. Referring to FIG. 10, the static electricity prevention part 530 may be formed as a plurality of lines on the bottom surface of the housing unit 400. That is, the static electricity prevention part 530 is exposed on the bottom surface of the housing unit 400.

The static electricity prevention part 530 may be formed of a conductive material. The static electricity prevention part 530 is formed of a material having high conductivity, and exposed to the outside of the housing unit so as to discharge static electricity flowing from outside.

FIG. 11 is a cross-sectional view of the housing unit 400 according to the exemplary embodiment of FIG. 10. Referring to FIG. 11, the static electricity prevention part 530 may be exposed on the bottom surface of the housing unit 400.

In this case, the fixing frame 500 and the static electricity prevention part 530 may be formed of the same material. Desirably, the fixing frame 500 and the static electricity prevention part 530 may be formed of a metal wire.

The static electricity prevention part 530 may not only serve to discharge static electricity, but also serve to support the structure of the housing unit 400 formed of a soft material.

Figure 12:
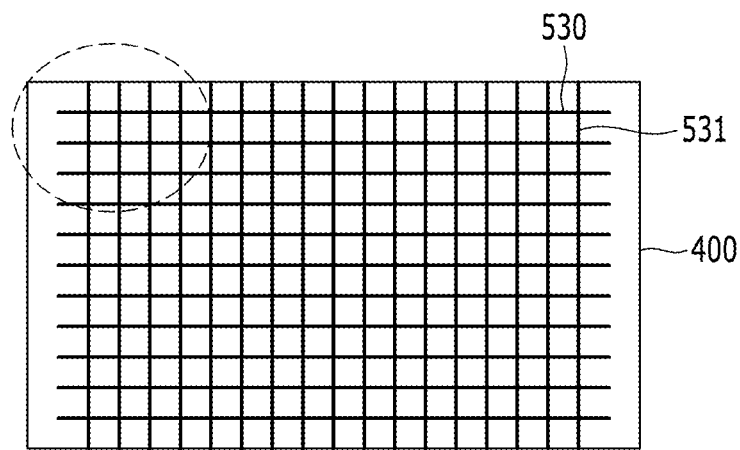
FIG. 12 illustrates the bottom surface of a housing unit of an LCD according to another exemplary embodiment.

FIG. 12 illustrates the bottom surface of a housing unit of an LCD according to another exemplary embodiment. The housing unit 400 according to the exemplary embodiment of FIG. 12 includes constituent elements similar to those of the housing unit 400 according to the exemplary embodiment of FIG. 10. The detailed descriptions of the similar constituent elements are omitted.

Referring to FIG. 12, however, the housing unit 400 of the LCD according to the present exemplary embodiment includes static electricity prevention parts 530, 531 formed in a lattice shape. That is, horizontal static electricity prevention parts 530 and vertical static electricity prevention parts 531 are formed in a lattice shape on the bottom surface of the housing unit 400 and exposed to the outside.

Thus, the static electricity prevention parts 530, 531 formed in a lattice shape may more effectively discharge static electricity flowing from outside.

Further, the static electricity prevention parts 530, 531 may be made of a metal having conductivity, and serve to support the bottom surface of the housing unit 400 made of a soft material.

Figure 13:
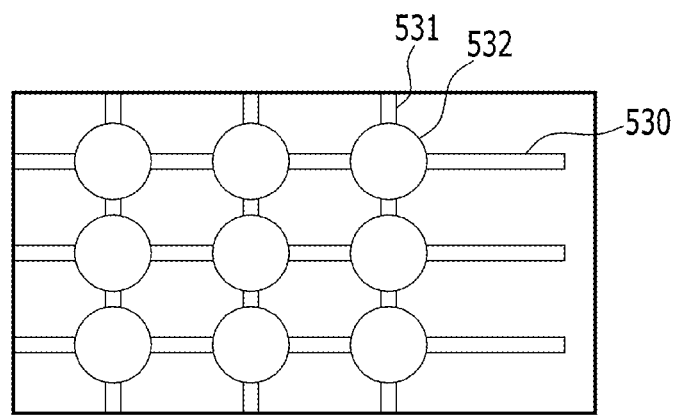
FIG. 13 is an expanded view of a region indicated by a dotted line in FIG. 12.

FIG. 13 is an expanded view of a region indicated by a dotted line in FIG. 12. Referring to FIG. 13, circular static electricity prevention parts 532 may be formed at the respective intersections between the horizontal static electricity prevention parts 530 and the vertical static electricity prevention parts 531. As the circular static electricity prevention parts 532 are formed at the respective intersections, static electricity may be more effectively discharged. Further, the structure of the housing unit 400 may be more reliably supported.

The horizontal static electricity prevention parts 530, the vertical static electricity prevention parts 531, and the circular static electricity prevention parts 532 may be made of the same material.

As such, the LCD according to the exemplary embodiment includes the housing unit 400 made of a soft flexible material and the fixing frames 500 formed in the housing unit 400 so as to support the structure of the housing unit 400. Further, the housing unit 400 may have an integrated structure including both of the bottom chassis and the top chassis. Thus, the housing unit 400 may maintain the shape thereof while being flexibly bent. Further, the housing unit 400 may be bent after a flexible liquid crystal panel 100 is housed in the housing unit 400. Further, since the bottom chassis and the top chassis are integrated with each other, the structure of the housing unit 400 may be simplified.

Figure 14A:
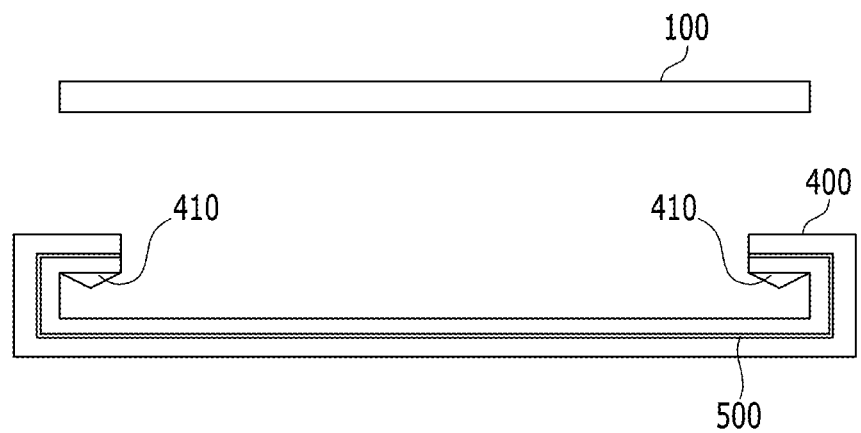
FIGS. 14A, 14B, and 14C briefly illustrate a method for housing a liquid crystal panel in a housing unit according to an exemplary embodiment.
Figure 14B:
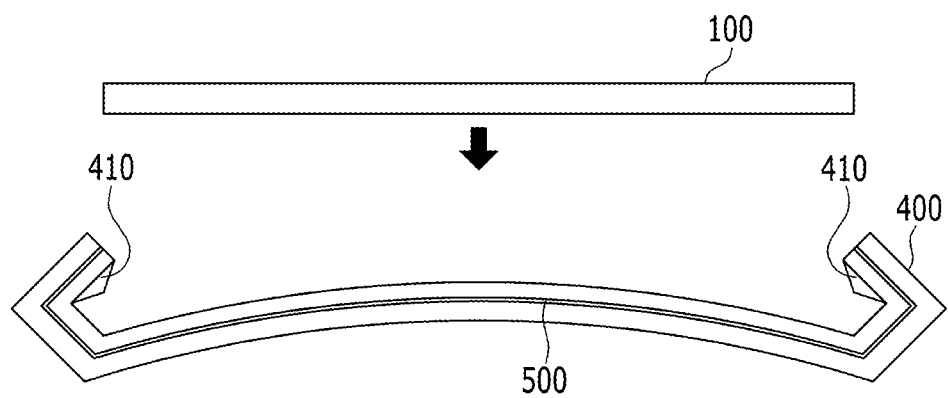
Figure 14C:
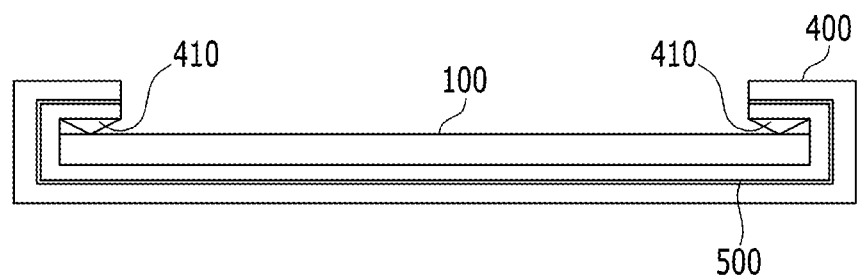

FIGS. 14A to 14C briefly illustrate a method for housing a liquid crystal panel 100 in a housing unit 400 according to an exemplary embodiment.

Referring to FIG. 14A, the liquid crystal panel 100 and the housing unit 400 are prepared. In this case, the housing unit 400 has an entrance space narrower than an internal space thereof. This is because the top fixing end for fixing the liquid crystal panel 100 is positioned at the top of the housing unit 400.

As illustrated in FIG. 14B, the housing unit 400 may be bent left and right because the housing unit 400 is formed of a soft material. As the housing unit 400 is bent, the entrance space of the housing unit 400 is widened. Then, the liquid crystal panel 100 can be put into the housing unit 400.

Then, as illustrated in FIG. 14C, the liquid crystal panel 100 is fixed in the housing unit 400, and the liquid crystal panel 100 is fixed by the fixing protrusion 410 of the top fixing end of the housing unit 400.

As described above, the liquid crystal panel 100 is a flexible liquid crystal panel. Thus, the LCD formed by housing the flexible liquid crystal panel 100 in the housing unit 400 made of a soft material may also be bent.

Conventionally, it was difficult to implement a flexible LCD because the housing unit was not bent even though the liquid crystal panel 100 was bent. However, in the LCD according to the exemplary embodiment, since the housing unit 400 is made of a flexible soft material, the LCD can be bent.

Figure 15A:
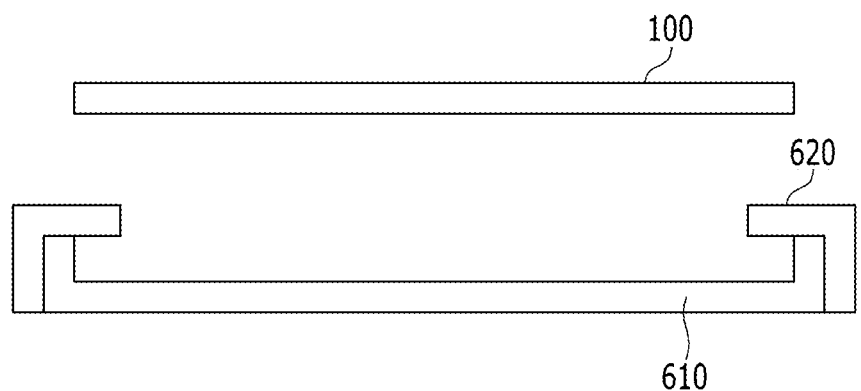
FIGS. 15A, 15B, and 15C briefly illustrate a process of housing a liquid crystal panel in a housing unit, in an LCD according to a comparative example.
Figure 15B:
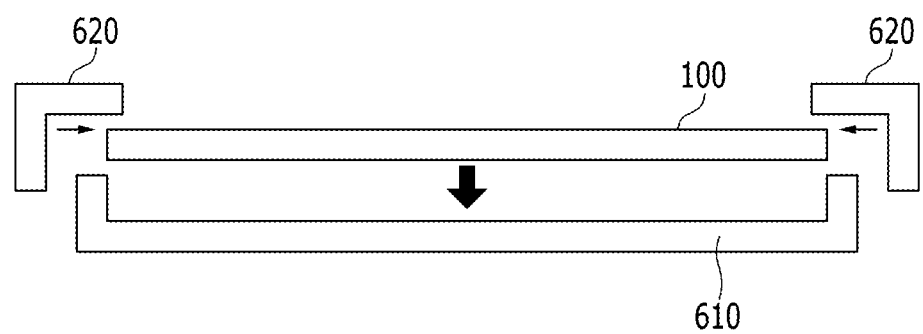
Figure 15C:
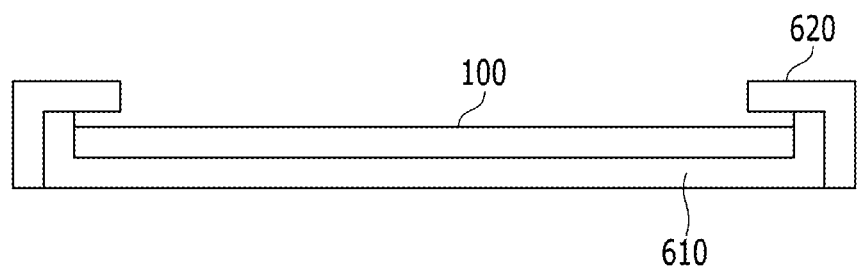

FIGS. 15A to 15C briefly illustrate a process of housing a liquid crystal panel 100 in a housing unit, in an LCD according to a comparative example.

Referring to FIG. 15A, the LCD according to the comparative example of includes a liquid crystal panel 100, a top chassis 620, and a bottom chassis 610.

That is, the housing unit of the LCD according to the comparative example includes the bottom chassis 610 for housing the liquid crystal panel 100 and the top chassis 620 for fixing the liquid crystal panel 100. The top chassis 620 and the bottom chassis 610 are formed of a hard material to maintain the structure of the housing unit.

Referring to FIG. 15B, the liquid crystal panel 100 is housed in the bottom chassis 610, and the top chassis 620 is coupled to the bottom chassis 610 in which the liquid crystal panel 100 is housed.

Thus, as illustrated in FIG. 15C, the LCD is completed. In the LCD according to the comparative example, the bottom chassis 610 and the top chassis 620 of the housing unit are separated from each other. Thus, the LCD requires the process of coupling the bottom chassis 610 and the top chassis 620 after housing the liquid crystal panel 100.

Further, since the housing unit of the LCD according to the comparative example is formed of a hard material, the housing unit is not bent even though the liquid crystal panel 100 can be bent. Thus, it is impractical to implement a flexible LCD.

However, as described with reference to FIGS. 14A to 14C, the housing unit 400 of the LCD according to the exemplary embodiment is bent because the housing unit 400 is formed of a soft material. Thus, the LCD may also be bent. Further, the housing unit 400 according to the exemplary embodiment has an integrated structure including both of the top chassis and the bottom chassis. Thus, the process can be simplified. In addition, since the fixing frames made of a hard material are included in the housing unit 400, the fixing frames may maintain the structure of the housing unit 400. The reinforcement parts formed at the edge sides or corners of the housing unit 400 may reinforce the structure of the housing unit 400.

Now, the liquid crystal panel 100 of the LCD according to the exemplary embodiment will be described. The liquid crystal panel 100 according to the exemplary embodiment may include any liquid crystal panels, as long as the liquid crystal panels can be bent.

Hereafter, an example of the liquid crystal panel 100 which can be applied to the housing unit will be described according to the exemplary embodiment.

Figure 16:
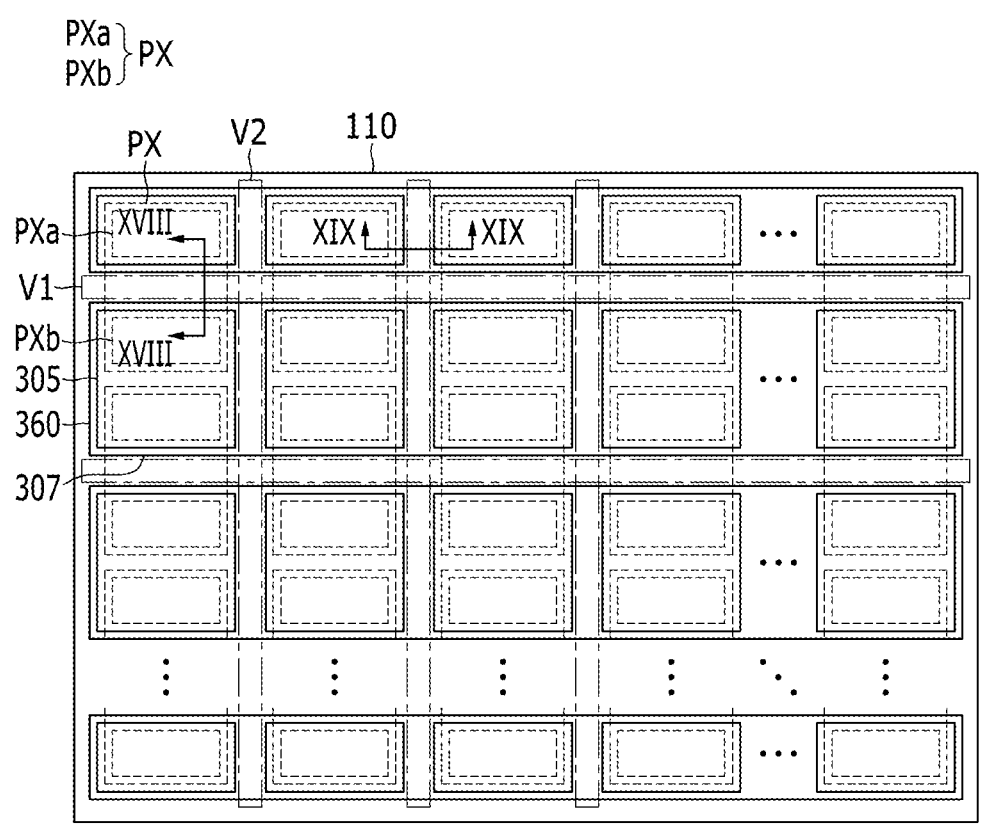
FIG. 16 is a top plan view of a liquid crystal panel according to an exemplary embodiment.

FIG. 16 is a top plan view of a liquid crystal panel according to an exemplary embodiment. FIG. 16 illustrates a part of constituent elements included in the liquid crystal panel, for convenience of description.

The display device according to the exemplary embodiment includes a substrate 110 made of glass or plastic and a roof layer 360 formed over the substrate 110.

The substrate 110 includes a plurality of pixel areas PX. The plurality of pixel areas PX are arranged in a matrix shape including a plurality of pixel rows and a plurality of pixel columns. Each of the pixel areas PX may include first and second subpixel areas PXa and PXb. The first and second subpixel areas PXa and PXb may be arranged above and below.

Between the first and second subpixel areas PXa and PXb, a first valley V1 is positioned along the direction of the pixel rows. Between the respective pixel columns, a second valley V2 is positioned.

The roof layer 360 is formed along the direction of the pixel rows. In this case, the first valley V1 has an injection hole 307 formed by partially removing the roof layer 360. Thus, the constituent elements positioned under the roof layer 360 may be exposed to the outside.

As the roof layers 360 is formed to be separated from the substrate 110 between the adjacent second valleys V2, a minute space 305, sometimes called a microcavity 305, is formed. Further, as the roof layer 360 is attached to the substrate 110 at the second valley V2, the roof layer 360 covers both side surfaces of the minute space 305.

The above-described structure of the display device according to the exemplary embodiment is only an example, but can be modified in various manners. For example, the arrangement of the pixel area PX, the first valley V1, and the second valley V2 may be changed, the plurality of roof layers 360 can be connected to each other at the first valley V1, and a part of each roof layer 360 may be formed to be separated from the substrate 110 at the second valley V2 such that the adjacent minute spaces 305 can be connected to each other.

Next, referring to FIGS. 16 to 19, one pixel of the display panel according to the exemplary embodiment will be described as follows.

Figure 17:
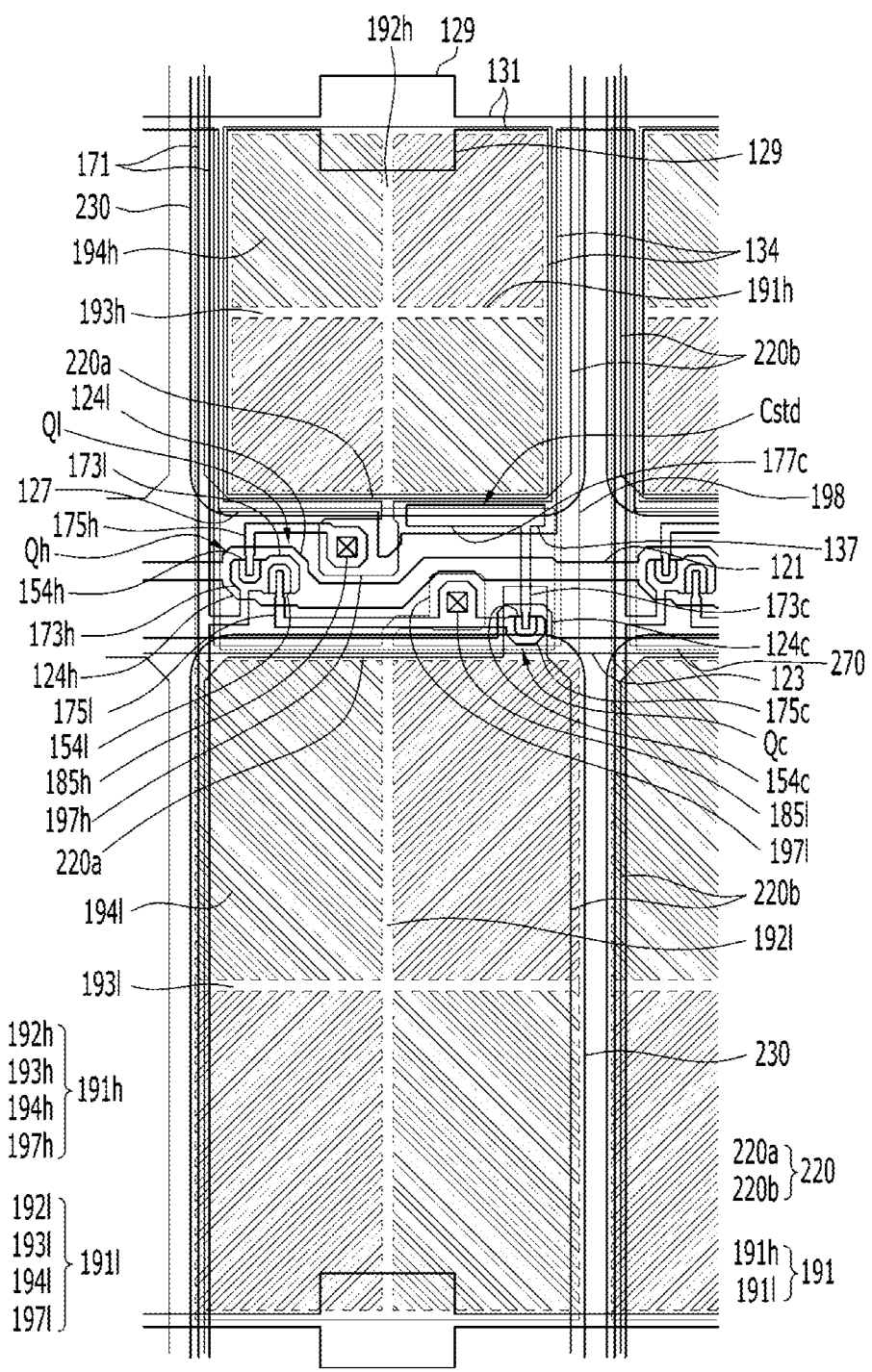
FIG. 17 is a top plan view illustrating one pixel of the display panel according to the exemplary embodiment.
Figure 18:
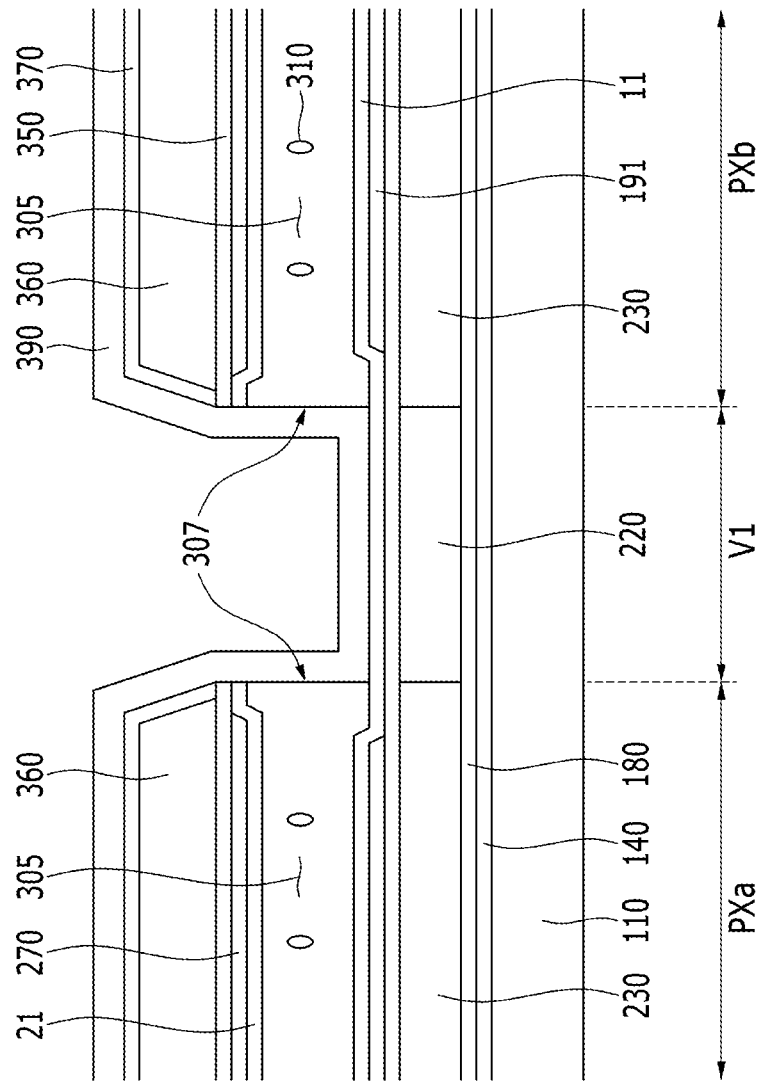
FIG. 18 is a cross-sectional view illustrating a part of the display panel according to the exemplary embodiment, taken along XVIII-XVIII line of FIG. 16.
Figure 19:
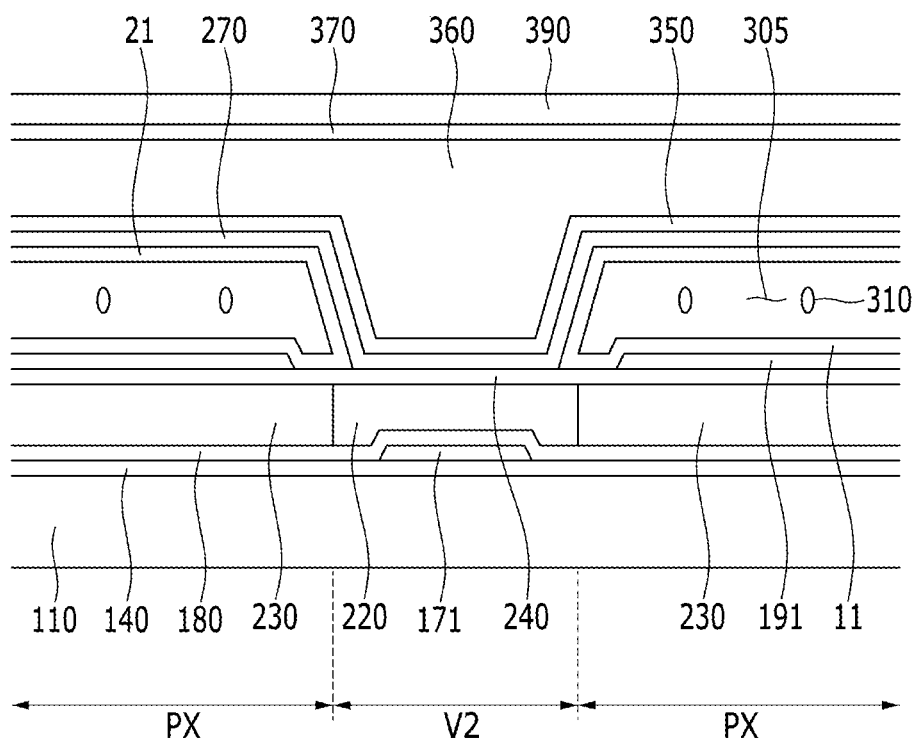
FIG. 19 is a cross-sectional view illustrating a part of the display panel according to the exemplary embodiment, taken along XIX-XIX line of FIG. 16.

FIG. 17 is a top plan view illustrating one pixel of the display panel according to the exemplary embodiment, FIG. 18 is a cross-sectional view illustrating a part of the display panel according to the exemplary embodiment, taken along XVIII-XVIII line of FIG. 16, and FIG. 19 is a cross-sectional view illustrating a part of the display panel according to the exemplary embodiment, taken along XIX-XIX line of FIG. 16.

Referring to FIGS. 16 to 19, a plurality of gate conductors are formed over a substrate 110, and include a plurality of gate lines 121, a plurality of reducing gate lines 123, and a plurality of storage electrode lines 131.

The gate line 121 and the reducing gate line 123 mainly extend in a horizontal direction and transmit a gate signal. The gate conductors further include first and second gate electrodes 124h and 124l protruding upward and downward from the gate line 121 and a third gate electrode 124c protruding upward from the reducing gate line 123. The first and second gate electrodes 124h and 124l are connected to form one protrusion. In this case, the protruding shapes of the first to third gate electrodes 124h, 124l, and 124c can be modified.

The storage electrode line 131 mainly extend in the horizontal direction, and transmits a predetermined voltage such as a common voltage Vcom. The storage electrode line 131 include a storage electrode 129 protruding upward and downward, a pair of vertical parts 134 extending downward in a direction which is substantially perpendicular to the gate line 121, and a horizontal part 127 connecting ends of the pair of vertical parts 134. The vertical part 127 includes a capacitive electrode 127 extending downward.

Over the gate conductors 121, 123, 124h, 124l, 124c, and 131, a gate insulating layer 140 is formed. The gate insulating layer 140 may be made of an inorganic insulating material such as silicon nitride (SiNx) or silicon oxide (SiOx). Further, the gate insulating layer 140 may have a single-layer or multilayer structure.

Over the gate insulating layer 140, a first semiconductor 154h, a second semiconductor 154l, and a third semiconductor 154c are formed. The first semiconductor 154h may be positioned over the first gate electrode 124h, the second semiconductor 154l may be positioned over the second gate electrode 124l, and the third semiconductor 154c may be positioned over the third gate electrode 124c. The first semiconductor 154h and the second semiconductor 154l may be connected to each other, and the second semiconductor 154l and the third semiconductor 154c may also be connected to each other. Further, the first semiconductor 154h may extend to below a data line 171. The first to third semiconductors 154h, 154l, and 154c may be formed of amorphous silicon, polycrystalline silicon, or metal oxide.

Over the first to third semiconductors 154h, 154l, and 154c, ohmic contacts (not illustrated) may be further formed. The ohmic contact may be made of silicide or n±hydrogenated amorphous silicon doped with an n-type impurity at a high concentration.

Over the first to third semiconductors 154h, 154l, and 154c, data conductors are formed, the data conductors including the data line 171, a first source electrode 173h, a second source electrode 173l, a third source electrode 173c, a first drain electrode 175h, a second drain electrode 175l, and a third drain electrode 175c.

The data line 171 transmits a data signal and mainly extends in a vertical direction so as to cross the gate line 121 and the reducing gate line 123. Each of the data lines 171 includes the first and second source electrodes 173h and 173l extending toward the first and second gate electrodes 124h and 124l and connected to each other.

Each of the first drain electrode 175h, the second drain electrode 175l, and the third drain electrode 175c includes one wide end and the other bar-shaped end. The bar-shaped ends of the first and second drain electrodes 175h and 175l are partially surrounded by the first and second source electrodes 173h and 173l. The wide end of the second drain electrode 175l extends again to form the third source electrode 173c bent in a U-shape. A wide end 177c of the third drain electrode 175c overlaps a capacitive electrode 137 so as to form a reducing capacitor Cstd, and the bar-shaped end is partially surrounded by the third source electrode 173c.

The first gate electrode 124h, the first source electrode 173h, and the first drain electrode 175h form a first thin film transistor Qh with the first semiconductor 154h. The second gate electrode 124l, the second source electrode 173l, and the second drain electrode 175l form a second thin film transistor Ql with the second semiconductor 154l. The third gate electrode 124c, the third source electrode 173c, and the third drain electrode 175c form a third thin film transistor Qc with the third semiconductor 154h.

The first semiconductor 154h, the second semiconductor 154l, and the third semiconductor 154c may be connected to each other and formed in a linear shape, and have substantially the same plan shape as the data conductors 171, 173h, 173l, 173c, 175h, 175l, and 175c and the ohmic contacts thereunder, except channel regions between the source electrodes 173h, 173l, and 173c and the drain electrodes 175h, 175l, and 175c.

The first semiconductor 154h has a part which is not covered by the first source electrode 173h and the first drain electrode 175h but exposed between the first source electrode 173h and the first drain electrode 175h. The second semiconductor 154l has a part which is not covered by the second source electrode 173l and the second drain electrode 175l but exposed between the second source electrode 173l and second drain electrode 175l. The third semiconductor 154c has a part which is not covered by the third source electrode 173c and the third drain electrode 175c but exposed between the third source electrode 173c and third drain electrode 175c.

A passivation layer 180 is formed over the data conductors 171, 173h, 173l, 173c, 175h, 175l, and 175c and the semiconductors 154h, 154l, and 154c exposed between the source electrodes 173h, 173l, and 173c and the drain electrodes 175h, 175l, and 175c, respectively. The passivation layer 180 may be made of an organic insulating material or inorganic insulating material, and have a single-layer or multilayer structure.

Over the passivation layer 180, a color filter 230 is formed in each pixel region PX, also called pixel areas PX. The color filter 230 may display one of three primary colors such as red, green, and blue. The color filter 230 is not limited to the three primary colors such as red, green, and blue, but may display cyan, magenta, yellow, and white-based colors. Unlike the drawing, the color filter 230 may extend in the column direction between the adjacent data lines 171.

At a region between the adjacent color filters 230, a light blocking member 220 is formed. The light blocking member 220 may be formed over the boundary of the pixel area PX and the first to third thin film transistors Qh, Ql, and Qc, and prevents light leakage. The color filter 230 may be formed in each of the first and second subpixel areas PXa and PXb, and the light blocking member 220 may be formed between the first and second subpixel areas PXa and PXb.

The light blocking member 220 includes a horizontal light blocking member 220a and a vertical light blocking member 220b. The horizontal light blocking member 220a extends upward and downward along the gate line 121 and the reducing gate line 123, and covers the region in which the first to third thin film transistors Qh, Ql, and Qc are positioned. The vertical light blocking member 220b extends along the data line 171. That is, the horizontal light blocking member 220a may be formed in the first valley V1, and the vertical light blocking member 220b may be formed in the second valley V2. The color filter 230 and the light blocking member 220 may partially overlap each other.

Over the color filter 230 and the light blocking member 220, a first insulating layer 240 may be further formed. The first insulating layer 240 may be made of an inorganic insulating material such as silicon nitride (SiNx), silicon oxide (SiOx), or silicon oxynitride (SiOxNy). The first insulating layer 240 serves to protect the color filter 230 made of the organic material and the light blocking member 220, and may be omitted if necessary. The first insulating layer 240 may serve to protect the light blocking member 220 and the color filter 230 formed of an organic material, and may be omitted, if necessary.

At the first insulating layer 240, the light blocking member 220, and the passivation layer 180, a plurality of first contact holes 185h and a plurality of second contact holes 185l are formed to extend to and expose the wide end of the first drain electrode 175h and the wide end of the second drain electrode 175l.

Over the first insulating layer 240, a pixel electrode 191 is formed. The pixel electrode 191 may be formed of a transparent metal material such as ITO (Indium Tin Oxide) or IZO (Indium Zinc Oxide).

The pixel electrode 191 includes first and second subpixel electrodes 191h and 191l which are isolated from each other with the gate line 121 and the reducing gate line 123 interposed therebetween, arranged at the top and bottom of the pixel area PX around the gate line 121 and the reducing gate line 123, and adjacent to each other in the column direction. That is, the first and second subpixel electrodes 191h and 191l are isolated from each other with the first valley V1 interposed therebetween, the first subpixel electrode 191h is positioned at the first subpixel area PXa, and the second subpixel electrode 191l is positioned at the second subpixel area PXb.

The first and second subpixel electrodes 191h and 191l are connected to the first and second drain electrodes 175h and 175l through the first and second contact holes 175h and 175l, respectively. Thus, when the first and second thin film transistors Qh and Ql are turned on, the first and second subpixel electrodes 191h and 191l receive a data voltage from the first drain electrode 175h and the second drain electrode 175l.

The first and second subpixel electrodes 191h and 191l have a rectangular shape as a whole, and include cross-shaped stem parts. The cross-shaped stem parts include horizontal stem parts 193h and 193l and vertical stem parts 192h and 192l crossing the horizontal stem parts 193h and 193l, respectively. Further, the first and second subpixel electrodes 191h and 191l include a plurality of fine branches 194h and 194l and protrusions 197h and 197l protruding downward or upward from the edge sides of the subpixel electrodes 191h and 191h, respectively.

The pixel electrode 191 is divided into four sub regions by the horizontal stem parts 193h and 193l and the vertical stem parts 192h and 192l. The fine branches 194h and 194l obliquely extend from the horizontal stem parts 193h and 193l and the vertical stem parts 192h and 192l, and form an angle of approximately 45 or 135 degrees with the gate line 121 or the horizontal stem parts 193h and 193l. Further, the fine branches 194h and 194l of the two adjacent sub regions may extend to cross each other.

In the present embodiment, the first subpixel electrode 191h further includes an outer stem part to surround the edge thereof, and the second subpixel electrode 191*l* further includes a horizontal part positioned at the top and bottom thereof and left and right vertical parts 198 positioned at the left and right of the first subpixel electrode 191*h*. The left and right vertical parts 198 may prevent a capacitive coupling between the data line 171 and the first sub-pixel electrode 191*h*.

The arrangement of the pixel areas, the structure of the thin film transistors, and the shape of the pixel electrodes are only an example. Thus, the embodiments are not limited thereto, but modified in various manners.

Over the pixel electrode 191, a common electrode 270 is formed to be spaced at a predetermined distance from the pixel electrode 191. Between the pixel electrode 191 and the common electrode 270, a microcavity 305 is formed. That is, the microcavity 305 is surrounded by the pixel electrode 191 and the common electrode 270. The width and area of the microcavity 305 may be modified in various manners depending on the size and resolution of the display device.

The common electrode 270 may be made of a transparent material such as ITO (Indium Tin Oxide) or IZO (Indium Zinc Oxide). The common electrode 270 may receive a predetermined voltage, and an electric field may be formed between the pixel electrode 191 and the common electrode 270.

Over the pixel electrode 191, a first alignment layer 11 is formed. The first alignment layer 11 may be formed over the first insulating layer 240 which is not covered by the pixel electrode 191.

Under the common electrode 270, a second alignment layer 21 is formed to face the first alignment layer 11.

The first and second alignment layers 11 and 21 may be implemented with a vertical alignment layer, and made of an alignment material such as polyamic acid, polysiloxane, or polyimide. The first and second alignment layers 11 and 21 may be connected to each other at the edge of the pixel area PX.

In the microcavity 305 positioned between the pixel electrode 191 and the common electrode 270, a liquid crystal layer including liquid crystal molecules 310 is formed. The liquid crystal molecules 310 having a negative dielectric anisotropy may be erected in a direction perpendicular to the substrate 110 in a state where an electric field is not applied. That is, vertical alignment may be achieved.

The first and second subpixel electrodes 191*h* and 191*l* to which a data voltage is applied may generate an electric field with the common electrode 270, and thus determine the direction of the liquid crystal molecules 310 positioned in the microcavity 305 between the two electrodes 191 and 270. According to the determined direction of the liquid crystal molecules 310, the luminance of light passing through the liquid crystal layer may differ.

Over the common electrode 270, a second insulating layer 350 may be further formed. The second insulating layer 350 may be made of an inorganic insulating material such as silicon nitride (SiNx), silicon oxide (SiOx), or silicon oxynitride (SiOxNy), and omitted if necessary.

Over the second insulating layer 350, the roof layer 360 is formed. The roof layer 360 may be made of an organic material. Under the roof layer 360, the microcavity 305 is formed. The roof layer 360 may be hardened through a hardening process and maintain the shape of the microcavity 305. That is, the roof layer 360 may be formed to be spaced from the pixel electrode 191 with the microcavity 305 interposed therebetween.

The roof layer 360 is formed in each pixel area PX and the second valley V2 along the pixel row, and not formed in the first valley V1. That is, the roof layer 360 is not formed between the first and second subpixel areas PXa and PXb. In each of the first and second subpixel areas PXa and PXb, the microcavity 305 is formed under the roof layer 360. In the second valley V2, the microcavity 305 is not formed under the roof layer 360, but formed to be attached to the substrate 110. Thus, the roof layer 360 positioned in the second valley V2 may be formed to a larger thickness than the roof layer 360 positioned in the first and second subpixel areas PXa and PXb. The top surface and both side surfaces of the microcavity 305 are covered by the roof layer 360.

At the common electrode 270, the second insulating layer 350, and the roof layer 360, the injection hole 307 is formed to extend to and expose a part of the microcavity 305. The injection holes 307 may be formed to face each other at the edges of the first and second subpixel areas PXa and PXb. That is, the injection hole 307 may be formed to extend to and expose the side surface of the microcavity 305 at the bottom side of the first subpixel area PXa and the top side of the second subpixel area PXb. Since the microcavity 305 is exposed through the injection hole 307, an aligning agent or liquid crystal material may be injected into the microcavity 305 through the injection hole 307.

Over the roof layer 360, a third insulating layer 370 may be further formed. The third insulating layer 370 may be made of an inorganic insulating material such as silicon nitride (SiNx), silicon oxide (SiOx), or silicon oxynitride (SiOxNy). The third insulating layer 370 may be formed to cover the top and side surfaces of the roof layer 360. The third insulating layer 370 may serve to protect the roof layer 360 formed of an organic material.

In the present embodiment, the structure in which the third insulating layer 370 is formed over the roof layer 360 has been described. However, the embodiments are not limited thereto, and the third insulating layer 370 may be omitted.

Over the third insulating layer 370, an overcoat 390 may be formed. The overcoat 390 is formed to cover the injection hole 307 which exposes a part of the microcavity 305 to the outside. That is, the overcoat 390 may seal the microcavity 305 such that the liquid crystal molecules 310 formed in the microcavity 305 do not come out. Since the overcoat 390 comes in contact with the liquid crystal molecules 310, the overcoat 390 may be made of a material which does not react with the liquid crystal molecules 310. For example, the overcoat 390 may be made of parylene.

The overcoat 390 may have a multilayer structure such as a double layer or triple layer. The double layer includes two layers formed of different materials. The triple layer includes three layers, of which adjacent layers are formed of different materials. For example, the overcoat 390 may include a layer formed of an organic insulating material and a layer formed of an inorganic insulating material.

Although not illustrated, a polarizer may be further formed on the top and bottom surfaces of the display device. The polarizer may include first and second polarizers. The first polarizer may be attached to the bottom surface of the substrate 110, and the second polarizer may be attached over the overcoat 390.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 11: First alignment layer | 21: Second alignment layer |
| 100: Liquid crystal panel | 110: Substrate |
| 121: Gate line | 123: Reducing gate line |
| 124h: First gate electrode | 124l: Second gate electrode |
| 124c: Third gate electrode | 131: Storage electrode line |
| 140: Gate insulating layer | 154h: First semiconductor |
| 154l: Second semiconductor | 154c: Third semiconductor |
| 171: Data line | 173h: First source electrode |
| 173l: Second source electrode | 173c: Third source electrode |
| 175h: First drain electrode | 175l: Second drain electrode |
| 175c: Third drain electrode | 180: Passivation layer |
| 191: Pixel electrode | 191h: First subpixel electrode |
| 191l: Second subpixel electrode | 220: Light blocking member |
| 230: Color filter | 240: First insulating layer |
| 270: Common electrode | |
| 305: Microcavity | 307: Injection hole |
| 310: Liquid crystal molecule | |
| 350: Second insulating layer | 360: Roof layer |
| 370: Third insulating layer | 390: Overcoat |
| 400: Housing unit | 410: Fixing protrusion |
| 500: Fixing frame | 420: Opening |
| 430: Second housing unit | 510a, b: Reinforcement part |
| 520: Corner reinforcement part | |
| 530: Horizontal static electricity prevention part | |
| 531: Vertical static electricity prevention part | |
| 532: Circular static electricity prevention part | |
| 610: Bottom chassis | 620: Top chassis |

What is claimed is:

1. A liquid crystal display (LCD) comprising:
a flexible liquid crystal panel; and
a housing unit for housing the liquid crystal panel,
wherein the housing unit has an integrated structure which includes a bottom surface, a side surface connected from the bottom surface, and a top fixing end connected from the side surface,
the liquid crystal panel is housed between the bottom surface and the top fixing end, and
the housing unit is formed of a flexible soft material having a fixing frame disposed therein such that the fixing frame cannot be seen from outside the housing unit.

2. The LCD of claim 1, wherein:
the top fixing end has a fixing protrusion disposed on a surface in contact with the liquid crystal panel.

3. The LCD of claim 2, wherein:
the fixing protrusion is formed of a material having a high friction force.

4. The LCD of claim 1, wherein:
the fixing frame is formed of a hard material.

5. The LCD of claim 1, wherein:
the fixing frame is a metal.

6. The LCD of claim 1, wherein:
the fixing frame is disposed only in a part of the housing unit.

7. The LCD of claim 1, wherein:
the fixing frame is disposed only in one direction of a horizontal direction and a vertical direction of the housing unit, or
disposed in both of the horizontal direction and the vertical direction of the housing unit.

8. The LCD of claim 1, wherein:
the housing unit has a quadrangle shape, and
includes reinforcement parts disposed along the side surface of the top fixing end and the outer surface of the housing unit.

9. The LCD of claim 8, wherein:
the reinforcement parts are formed of a hard material.

10. The LCD of claim 9, wherein:
the reinforcement parts are formed of a metal or reinforced plastic.

11. The LCD of claim 1, wherein:
the housing unit has corner reinforcement parts disposed at respective corners of the housing unit so as to cover the bottom surface, the side surface, and the top surface of the housing unit.

12. The LCD of claim 11, wherein:
the corner reinforcement parts are formed of a hard material.

13. The LCD of claim 12, wherein:
the corner reinforcement parts are formed of a metal or reinforcement plastic.

14. The LCD of claim 1, wherein:
the housing unit has a static electricity prevention part disposed on the bottom surface so as to be exposed to the outside, and
the static electricity prevention part is formed of a conductive material.

15. The LCD of claim 14, wherein:
the static electricity prevention part is disposed as a plurality of lines arranged in one direction of the bottom surface.

16. The LCD of claim 14, wherein:
the static electricity prevention part is disposed in a lattice shape on the bottom surface.

17. The LCD of claim 1, wherein:
the liquid crystal panel comprises:
a substrate including a plurality of pixel areas arranged in a matrix shape including a plurality of pixel rows and a plurality of pixel columns;
a thin film transistor disposed over the substrate;
a pixel electrode connected to the thin film transistor so as to be disposed in the pixel areas;
a common electrode disposed over the pixel electrode so as to be spaced from the pixel electrode with a microcavity interposed therebetween;
a roof layer disposed over the common electrode;
a liquid crystal injection hole disposed in the common electrode and the roof layer so as to extend to a part of the microcavity;
a liquid crystal layer filling the microcavity; and
an overcoat disposed over the roof layer so as to cover the liquid crystal injection hole, and sealing the microcavity.

18. The LCD of claim 17, wherein:
the liquid crystal panel is bent in the left and right or top and bottom direction.

19. The LCD of claim 1, wherein:
the housing unit has an integrated structure which includes a bottom surface of a quadrangle, four side surfaces disposed in four directions perpendicular to the bottom surface, and a top fixing end disposed at each side surface so as to extend in parallel to the bottom surface, and
the top fixing end has a frame shape.

* * * * *